(12) United States Patent
Padden et al.

(10) Patent No.: US 9,642,073 B2
(45) Date of Patent: May 2, 2017

(54) TARGET ACCESS POINT RECOMMENDATION

(71) Applicant: Cable Television Laboratories, Inc., Louisville, CO (US)

(72) Inventors: Joey Padden, Boulder, CO (US); Jennifer Andreoli-Fang, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 14/665,207

(22) Filed: Mar. 23, 2015

(65) Prior Publication Data

US 2015/0195776 A1 Jul. 9, 2015

Related U.S. Application Data

(63) Continuation of application No. 13/665,085, filed on Oct. 31, 2012, now Pat. No. 8,989,747.

(51) Int. Cl.
*H04W 48/16* (2009.01)
*H04W 36/00* (2009.01)
*H04W 64/00* (2009.01)
*H04W 36/32* (2009.01)
*H04W 48/00* (2009.01)
*H04W 4/02* (2009.01)

(52) U.S. Cl.
CPC .......... *H04W 48/16* (2013.01); *H04W 36/00* (2013.01); *H04W 36/0061* (2013.01); *H04W 36/32* (2013.01); *H04W 48/00* (2013.01); *H04W 64/00* (2013.01); *H04W 64/003* (2013.01); *H04W 4/027* (2013.01); *H04W 64/006* (2013.01)

(58) Field of Classification Search
CPC ............. H04W 48/16; H04W 36/0061; H04W 64/003; H04W 36/32; H04W 64/00; H04W 48/00; H04W 36/00
See application file for complete search history.

(56) References Cited

U.S. PATENT DOCUMENTS 6,813,508 B1 11/2004 Shioda
2012/0213201 A1 8/2012 Olvera-Hernandez

*Primary Examiner* — Nam Huynh
(74) *Attorney, Agent, or Firm* — Great Lakes Intellectual Property, PLLC.

(57) ABSTRACT

Recommending a target access point is contemplated. The target access point recommendation may be used to recommend device connection to an access point having capabilities sufficient to facilitate access to electronic services, such as but not necessarily limited to recommending connection of a wireless device to a cellular or Wi-Fi capable access point.

15 Claims, 2 Drawing Sheets

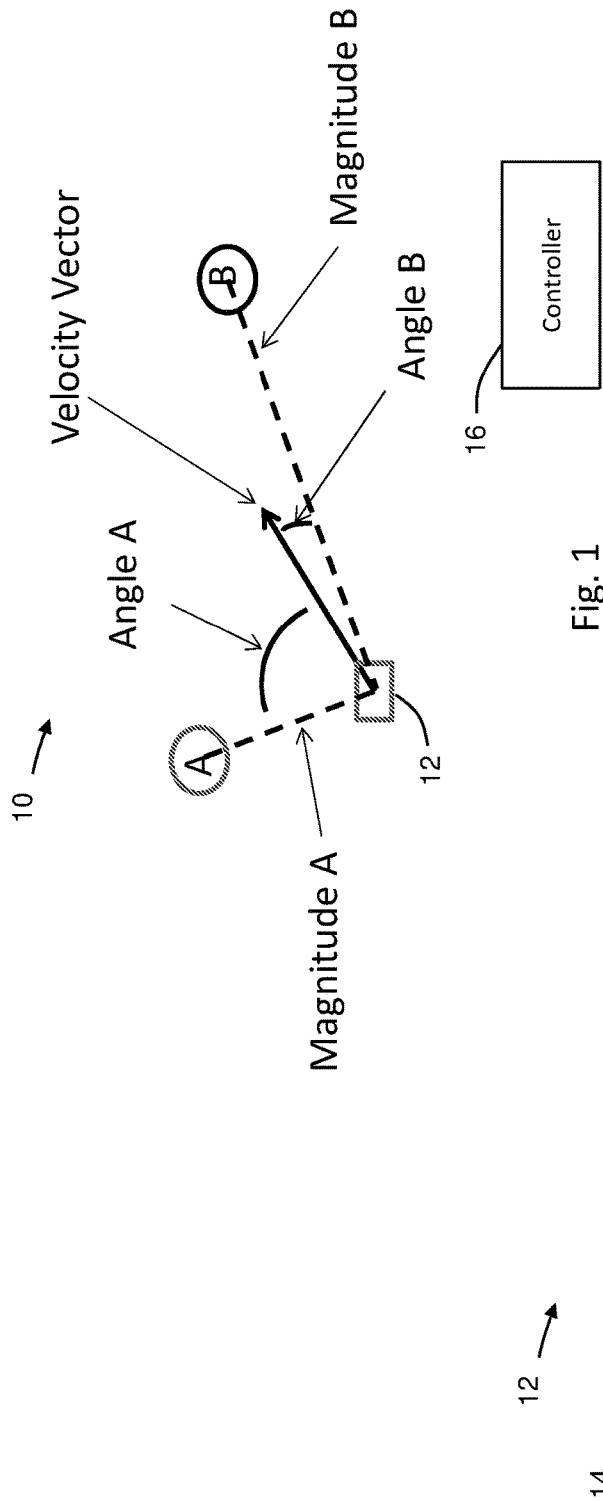

TARGET ACCESS POINT RECOMMENDATION

CROSS-REFERENCE TO RELATED APPLICATIONS

This application is a continuation of U.S. application Ser. No. 13/665,085, filed Oct. 31, 2012 and now U.S. Pat. No. 8,989,747, the disclosure of which is incorporated in its entirety by reference herein.

TECHNICAL FIELD

The present invention relates to facilitating target access point recommendations, such as but not necessarily limited to recommending connection to a target access point while a wireless device travels between available access points.

BACKGROUND

Devices, such as but not necessarily limited to mobile computers, cellular phones, tablets and essentially any other device having a processor and wireless communication circuit, are considered to be wireless devices when configured to facilitate wireless dependent services. The wireless dependent services may correspond with virtually any type of service that requires exchange of wireless signaling, including phone/cellular services, data services (data download, web browsing, etc.), content viewing/access services (television broadcasting, video streaming, gaming, etc.), global positioning system (GPS) dependent services (navigation) and the like. The wireless signaling required to support the wireless dependent services may be facilitated with wireless access points. The wireless access points may be fixed or movable structures positioned in different geographical areas to facilitate wireless signaling with wireless devices.

A wireless device may be required to perform handover operations or otherwise switch communications from one wireless access point to another wireless access point. Such handovers may be required in the event a wireless device approaches a wireless boundary or other wireless communication range limit of an access point to which it is currently exchanging wireless signaling and/or for some other reason, such as but not necessary limited to maintenance, removal or some other interoperability of the currently connected access point. The present invention contemplates recommending a target access point to wireless devices needing to perform a handover or to otherwise switch wireless access points. The target access point recommendation may be used to identify the next access point to which the wireless device is to connect in order to facilitate wireless signal exchange.

BRIEF DESCRIPTION OF THE DRAWINGS

FIG. 1 illustrates a wireless system in accordance with one non-limiting aspect of the present invention.

FIG. 2 illustrates a component diagram for the wireless device in accordance with one non-limiting aspect of the present invention.

DETAILED DESCRIPTION

Figure 3:
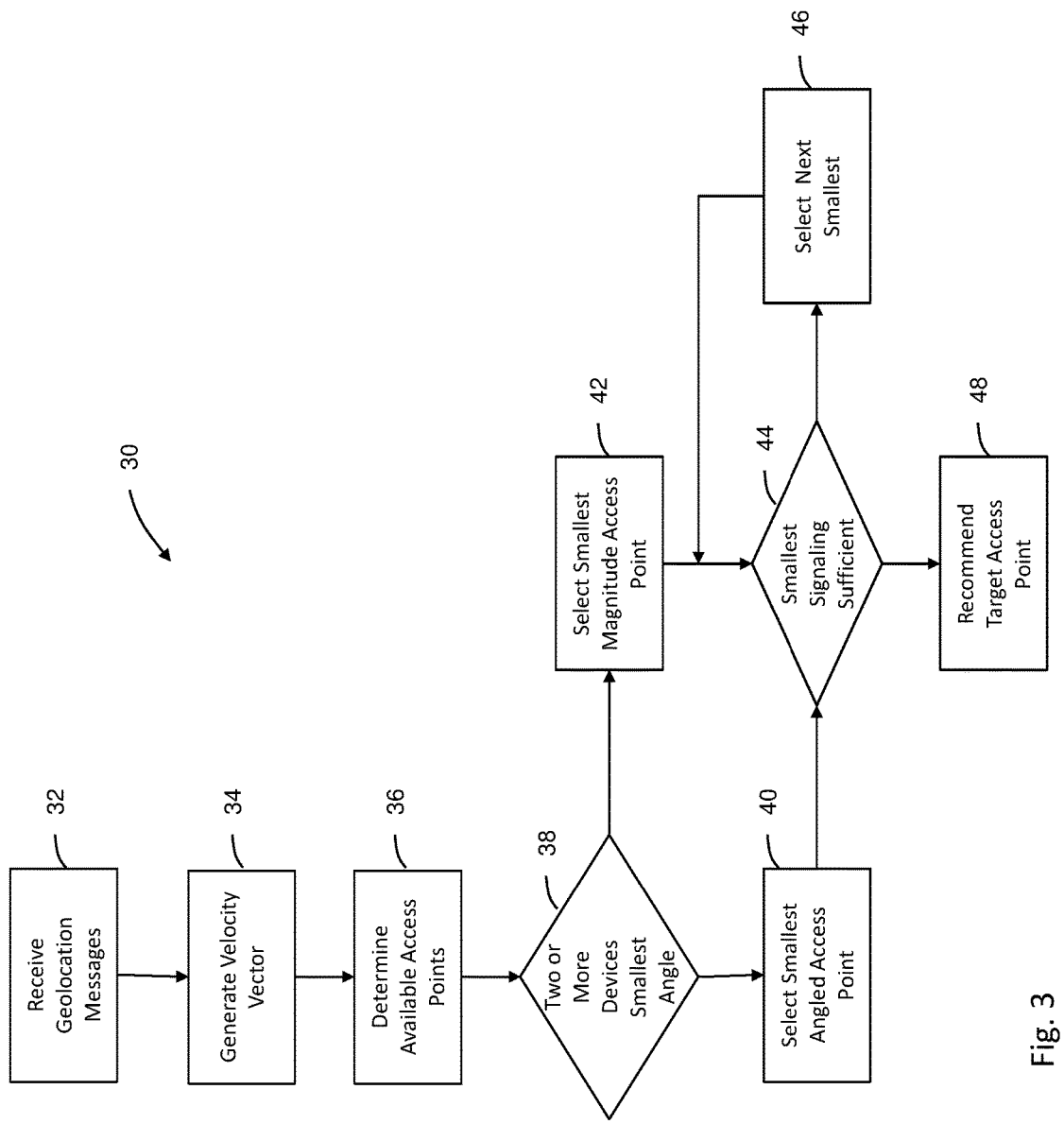
FIG. 3 illustrates a flowchart for a method of generating a target access point recommendation in accordance with one non-limiting aspect of the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 illustrates a wireless system 10 in accordance with one non-limiting aspect of the present invention. The wireless system 10 may be configured to facilitate wireless signaling between a wireless device 12 and one or more wireless access points A, B. The wireless system 10 illustrates a single wireless device 12 and two wireless access points A, B for exemplary purposes as the present invention fully contemplates its use in systems having additional wireless devices 12 and/or wireless access points A, B. The wireless system 10 may be configured to facilitate virtually any type of service that requires exchange of wireless signaling, including phone/cellular services, data services (data download, web browsing, etc.), content viewing/access services (television broadcasting, video streaming, gaming, etc.), global positioning system (GPS) dependent services (geolocation tracking, navigation) and the like. The wireless signaling is predominately described with respect to being signaling suitable for transmission using cellular and/or Wi-Fi technologies, however, any suitable wireless infrastructure or technology may be used without deviating from the scope and contemplation of the present invention, including the use of satellite based communications.

FIG. 2 illustrates a component diagram for the wireless device 12 in accordance with one non-limiting aspect of the present invention. The wireless device 12 is shown to include a cellular circuit 14, a Wi-Fi circuit 16 and a GPS circuit 18 in addition to a power source 20 and a processor/memory 22. The power source 20 may be a battery or other suitable source of energy having capabilities sufficient to facilitate powering the circuits 14, 16, 18 and/or the processor/memory 22. The processor/memory 22 may include computer-readable code stored in a non-transitory form sufficient to facilitate controlling the wireless device 12 and/or otherwise facilitating the methods and operations contemplated by the present invention, e.g., the processor/memory 22 may be configured to facilitate use of a target access point recommendation application that may be downloaded to or otherwise included on the wireless device. The cellular circuit 14 may be comprised of a cellular antenna and associated electronics used to facilitate cellular based communications. The Wi-Fi circuit 16 may be comprised of a Wi-Fi antenna and associated electronics used to facilitate Wi-Fi-based communications. The GPS circuit 18 may be comprised of a GPS antenna and associated electronics used to facilitate GPS communications.

The cellular circuit 14, Wi-Fi circuit 16 and GPS circuit 18 are separately illustrated in order to demonstrate the capability of the present invention to facilitate selective use/powering of each circuit 14, 16, 18. One non-limiting aspect of the present invention contemplates selectively powering or otherwise using the cellular circuit 14, the Wi-Fi circuit 16 and the GPS circuit 18 in a manner that ameliorates power consumption associated with the inventive process for generating a target access point recommendation. This may include the processor 22 controlling the power source 20 to prevent or limit power provided to any one or more of the cellular circuit 14, the Wi-Fi circuit 16 and the GPS circuit 18. In particular, the processor 22 may be included to control power consumption by preventing or otherwise controlling power provided to the cellular antenna, the Wi-Fi antenna and the GPS antenna, each of which may include transmit and receive circuitry that may also be selectively powered.

The processor 22 may selectively enable and disable any one or more of the antennas or other features of the wireless device 12 in order to control power consumption, i.e., the GPS antenna may be used to facilitate continuous assessment of location while the Wi-Fi and cellular antennas are disabled or otherwise prevented from consuming power as part of non-essential Wi-Fi and/or cellular signaling. While the use of separate antennas is noted, the present invention fully contemplates other configurations for the wireless device 12, including the use of a common antenna where one or more of the cellular circuit 14, the Wi-Fi circuit 16 and GPS circuit 18 commonly use the same antenna. While the cellular circuit 14, Wi-Fi circuit 16 and GPS 18 circuit are shown to be separate, the present invention fully contemplates its use with devices where the cellular circuit 14, Wi-Fi circuit 16 and GPS circuit 18 may not be standalone components capable of being independently controlled/powered. The present invention contemplates a process for generating the target access point recommendation in an energy conservative manner but is not necessarily intended to be limited to controlling or otherwise ameliorating power consumption of the device while performing operations contemplated to facilitate generating the target access point recommendation.

The target access point recommendation may be generated by the device 12 and/or by a controller 26 (see FIG. 1). The present invention is described for exemplary and non-limiting purposes with respect to the controller 26 generating the target access point recommendation for subsequent use by the wireless device. This is done without intending to limit the scope and contemplation of the present invention as the present invention fully contemplates the wireless device 12 or other devices associated with the system 10 facilitating generation of the target access point recommendation instead of or in cooperation with the controller 26. The controller 26 may be configured to monitor/control the access points A, B and/or it may be an independent server capable of communicating with the wireless device 12.

The target access point recommendation may be used to instruct the wireless device 12 to connect to one or more of the wireless access points A, B. Optionally, the recommendation may not necessarily command the wireless device 12 to connect at least in that the wireless device 12 may retain some autonomy over whether to make the recommended connection, e.g., the wireless device 12 may perform a different connection or remain at a current connection according to user preferences, habits, override, etc. In some configurations, the wireless device 12 may be configured to facilitate simultaneous communications with multiple access points A, B, such as to facilitate simultaneous use of cellular and Wi-Fi services with one or more access points configured to facilitate cellular and/or Wi-Fi signaling. This may include the cellular circuit 14 communicating with a cellular access point and the Wi-Fi circuit simultaneously communicating with a Wi-Fi access point. The number of access points needed to facilitate operations may be dependent on services being requested or supported through the wireless device 12.

The target access point recommendation may specify more than one access point for future connection depending on the particular configuration and/or operating requirements of the wireless device. Separate target access point recommendations may be generated for each service requiring wireless signaling and/or multiple recommendations may be included in a single recommendation. The processor 22 or operating system and/or applications executing on the wireless device 12 may be configured to identify the type of access point A, B needed for certain operations in order to insure the appropriate target access point recommendations are made. The exemplary description provided hereinafter recommends connection to a single access point in order to simplify presentation.

The description hereinafter also predominately relates to generating the target access point recommendation as the wireless device travels between service areas of various access points A, B such that a handover to another access point is needed when approaching a limit of a currently connected access point in order to facilitate continued access to on-going services. The need for conducting a handover is not necessarily limited to this situation as handovers may be needed when an access point A, B is designated for maintenance while actively supporting communications, when an access point A, B is deconstructed/temporary (e.g. a mobile picocell) and/or when a service requiring wireless signaling is newly activated (e.g., when initially powering "on" the device or starting an application anew).

One non-limiting aspect of the present invention contemplates generating the target access point recommendation based on movement of the wireless device 12. The movement may be characterized with a velocity vector. The velocity vector may be used to represent an angle and a magnitude of movement for the wireless device 12. The velocity vector may be calculated by the controller 26, or optionally by the wireless device, 12 from geolocation/GPS coordinates generated by the GPS circuit 18. The wireless device 12 may rely on the GPS circuit 18 to facilitate periodically generating geolocation messages, for example containing the device longitude, latitude, and elevation, to be transmitted to the controller 26. The geolocation messages may include GPS coordinates reflective of geolocation information sufficient for use in assessing a position of the wireless device 12 at a particular point in time. The controller 26 may be configured to process one or more of the geolocation messages in order to generate the contemplated velocity vector. The controller 26 may obtain geolocation information, velocity vectors or other coordinates for static and/or mobile access points A, B within a vicinity of the wireless device 12. This access point geolocation information may be compared with the wireless device geolocation information to determine the relative positioning of the wireless device 12 to each access point A, B in order to facilitate generating the target access point recommendation contemplated by the present invention.

The controller 26 may generate the target access point recommendation to recommend connection to an access point A, B as a function of to the movement of the wireless device 12. One non-limiting aspect of the present invention contemplates recommending the access point A, B having the smallest angular position to the wireless device when a handover is desired. As shown in FIG. 1, the wireless device 12 is traveling relative to an access point A and an access point B. The velocity vector associated with the wireless device 12 may be compared to the geolocation information associated with access points A, B to generate an angle and a magnitude representing relative positioning of the wireless device 12 to each of the access points A, B. The angle and magnitude (distance) of the wireless device to the access point A is shown to respectively correspond with an angle A and magnitude A and the angle and magnitude of the wireless device 12 to the axis point B is shown to respectively correspond with an angle B and magnitude B. The wireless device 12 is positioned at a smaller angle to access point B than to the access point A such that the target access point recommendation may be used to recommend connection to the access point B. This recommendation may be based at least in part on the assumption that the mobile device will continue to travel in the direction represented with the velocity vector. The controller 26 could also learn behavior over time. If you are at the intersection of two major roads, and one leads towards downtown for example, the controller 26 can use relative probabilities to decide which direction of travel is most likely for the device 12. This may be characterized as "soft decision" making compared to using some fixed threshold which may be characterized called "Hard Decision" making The target access point recommendation for access point B is determined even though the wireless device 12 is closer to the axis point A. This is done since the velocity vector indicates future movement of the wireless device in the direction of the access point B, which will eventually lead the wireless device 12 away from the access point A. While the present invention fully contemplates recommending a closest one of the access points A, B, it is believed that recommending access point B having the smallest angle to the wireless device 12 may be more beneficial in anticipating the future connection needs of the wireless device 12. An assessment of the wireless signaling range of the access points A, B within the vicinity of the wireless device 12 may be considered when determining access point candidates to be considered when generating the target access point recommendation in order to ensure the recommended access point is within a suitable wireless signaling range to the wireless device 12, i.e., such that a handover can occur without disrupting signaling with the wireless device 12 or otherwise interrupting wireless signaling dependent services. In the event multiple wireless access points are determined to have the same angular position relative to the wireless device 12, the access point closest to the wireless device 12 may be recommended, i.e., the access point having the smallest magnitude. The use of magnitude in this determination may be beneficial in case the wireless device 12 makes an unanticipated change in direction.

FIG. 3 illustrates a flowchart 30 for a method of generating a target access point recommendation in accordance with one non-limiting aspect of the present invention. The method is described with respect to the controller 26 recommending a target access point to the wireless device 12, however, the present invention is not necessarily so limited and contemplates the wireless device 12 or other device associated with a system 10 recommending the target access point. The target access point recommendation may be used to instruct, recommend or command the wireless device 12 to connect to a particular access point. The wireless device 12 may include capabilities sufficient to assess the recommendation and to perform operations necessary to facilitate connection to the recommended access point. This may include awaiting occurrence of a triggering event and/or performing handshake related operations according to particular operating protocols or configurations of the targeted access point. The wireless device 12 may also include capabilities sufficient to request or otherwise instigate generation of the target access point recommendation, such as by continuously monitoring activities of the wireless device 12 for situations in which a handover or other event may be occurring or likely to occur in the future.

Block 32 relates to the controller 26 receiving geolocation messages from the wireless device 12 or multiple wireless devices. The wireless device 12 may generate the geolocation information to be carried within the geolocation messages. Optionally, the geolocation information may be generated without reliance on the cellular circuit 14, the Wi-Fi circuit 16 or other wireless circuits associated with the wireless device 12, i.e., the geolocation information may be determined solely using the GPS circuit 18. The ability to generate the geolocation information without reliance on one or both of the cellular and Wi-Fi circuits 14, 16 may be beneficial in ameliorating energy consumption of the wireless device 12, at least with respect to energy consumed in order to facilitate generating the target access point recommendation contemplated by the present invention. This may equate to, conservatively, a greater than 15× reduction in power consumption anytime the GPS circuit 18 can be used to facilitate identifying the target access point in place of the Wi-Fi or Cellular radios 14, 16. The use of the GPS circuit 18 instead of the Wi-Fi or cellular circuits 14, 16 may also be beneficial in saving time since the Wi-Fi and/or cellular circuits 14, 16 would need to sample/measure nearby cells or access points to determine which is best. The GPS circuit 18 may optionally need only to report geolocation and not undertake the time and power consumption necessary to measure nearby access points.

The energy savings may be significant, as shown in the table presented below to illustrate representative energy consumption of the wireless circuits of the wireless device.

| | Operation | | |
|---|---|---|---|
| Circuit | Idle | Transmitting | Receiving |
| Cellular | 20 mW | 3000 mW | 1000 mW |
| Wi-Fi | 40 mW | 1500 mW | 1000 mW |
| GPS | 60 mW | N/A | 60 mW |

The table illustrates various operating conditions for the circuits, namely idle, transmitting and receiving conditions. The idle conditions may correspond with the circuit being powered but not actively transmitting messages, i.e., the associated antenna and related drive circuitry is ready to transmit a message but the antenna is not actively being driven to transmit or receive wireless signals. The transmitting condition may correspond with the circuit being powered as well as the antenna being driven to transmit wireless signals, e.g., the antenna is actively issuing wireless signals. The receiving condition may correspond to circuit being powered as well as antenna being driven to receive wireless signals, e.g., the antenna is actively receiving wireless signals. The cellular circuit 14 and the Wi-Fi circuit 16 are shown to have different energy consumption profiles depending on the corresponding operating condition whereas the GPS circuit 18 is shown to maintain a consistent consumption profile regardless of the operating condition. The GPS circuit 18 may be configured differently than the cellular 14 and Wi-Fi circuits 16 such that its energy consumption profile remains consistent throughout its operation, which may be due to the GPS circuit 18 having to continuously perform the same energy consuming operations in order to generate the geolocation information whereas the cellular circuit 14 and/or the Wi-Fi circuit 16 perform different energy consuming operations depending on whether they are required to transmit or receive signals.

The geolocation messages may be generated by the wireless device 12 while the cellular circuit 14 and the Wi-Fi circuit 16 are operating according to the idle, transmitting and receiving conditions. The energy conservation strategy contemplated by the present invention may include limiting use of the cellular circuit 14 and the Wi-Fi circuit 16, at least with respect to their involvement in generating the geolocation information/message. In other words, unless the cellular circuit 14 and/or the Wi-Fi circuit 16 are needed for some other operation besides generating the geolocation information, the circuits may be turned "off" such that they consume no energy or placed in the idle operating condition in order to limit their energy consumption. The GPS circuit 18 instead may be solely relied upon to generate the geolocation information for use by the processor 22 in generating the corresponding geolocation message. When the geolocation messages are ready for transmission to the controller 26, the processor 22 may transition the cellular and/or Wi-Fi circuit 14, 16 to the transmitting operating condition in order to facilitate wireless transmission of the geolocation message. The transitioning of the cellular and/or Wi-Fi circuit from one of the "off" or idle condition to the transmitting operating condition may be timed relative to generation and transmission of the geolocation message in order to limit the amount of time that the circuits 14, 16 are required to be in the transmitting state, thereby conserving energy.

Optionally, rather than transmitting separate copies of the geolocation message using both of the cellular circuit 14 and the Wi-Fi circuit 16 at the same time, a single one of the circuits 14, 16 may be selected to facilitate transmitting a single copy of the geolocation message. The selected circuit may be the circuit currently in use and/or for which a nearby access point is capable of facilitating communications, i.e., Wi-Fi communications may not be as readily available as cellular communication such that it may be preferable to use the cellular circuit when Wi-Fi is unavailable. Alternatively, the selected circuit may be the one having the lowest energy consumption or the one that consumes the least amount of subscription services, i.e., a user of the wireless device may have a data plan or other message transmission restriction/fees such that it may be beneficial to limit consumption of those subscription-based services whenever possible (use of Wi-Fi services may be less costly than use of cellular services). The circuit used to facilitate transmission of the geolocation message may be returned to the idle or "off" condition after completing the corresponding transmission and/or the transmitting circuit may be transmitted to a receiving condition in order to receive the target access point recommendation from the controller 26. If the transmitting circuit is returned to idle or "off", it may be subsequently transitioned to the receiving condition after a time delay associated with the controller 26 processing the geolocation information and transmitting the responsive target access point recommendation to the wireless device.

Block 34 relates to the controller 26 generating a velocity vector for the wireless device 12. The velocity vector may be generated by the controller processing multiple geolocation messages received from the wireless device 12. The geolocation messages received from the wireless device 12 may include identifiers or addresses unique to each wireless device 12 being serviced by the controller 26 in order to properly tabulate movement of the wireless device 12. The velocity vector may be calculated as a Euclidean type of vector in order to convey an angle and a magnitude associated with movement of the wireless device.

Block 36 relates to determining available access points. The available access points may be those within a vicinity of the wireless device 12 having capabilities sufficient to facilitate cellular, Wi-Fi or other wireless signaling desires of the wireless device 12. The vicinity may be determined based in part on the velocity vector identifying a current location of the wireless device 12. The vicinity may be a design parameter dependent on particular wireless signaling capabilities within the current location of the wireless device 12. The vicinity may be expanded or contracted depending on the velocity of the wireless device 12 such that the vicinity is narrowed when the wireless device is moving slowly and expanded when the wireless device is moving faster.

Some areas may have poorer communication capabilities than others such that the vicinity in those areas may be narrowed in order to limit selection to closer access points whereas the vicinity may be widened in areas having better signaling capabilities in order to expand the number of available access points. The vicinity analysis may also be based in part on wireless signaling communication ranges of the access points in the location of the wireless device 12 such that any access point believed to have a wireless signaling communication range sufficient to reach the wireless device 12 may be considered to be within the vicinity. The controller 26 may include a map or other table in which the current location of the wireless device 12 may be cross-referenced with nearby access points and/or access points may be configured to identify themselves to the controller 26 in order to be considered, e.g., mobile access points may be configured to provide velocity vectors or other information to the controller 26.

Block 38 relates to assessing which one or more of the available access points would be suitable for recommendation as the target access point. One non-limiting aspect of the present invention contemplates selecting the access point having the smallest angular position relative to the wireless device 12 to be the target access point. Block 38 relates to making this assessment, including identifying whether two or more devices have the same or approximately the same angular position to the wireless device 12 where those two access points are also associated with the smallest angle to the wireless device 12. The access points may be considered to have the same angular position to the wireless device if the angular values are within 5% of each other or if the velocity vector changes over time to indicate the wireless device 12 toggling back and forth between two or more of the access points. This may occur if, at relatively small intervals of time, the wireless device 12 is angularly closer to one access point and then subsequently moves to become closer to another access point and then back to become closer to the former access point such that the wireless device toggles between the two access points at a rate sufficient to demonstrate a repeating pattern or anticipated consistency of movement between the two access points.

Block 40 relates to at least initially selecting the access point associated with the smallest angle to be the target access point if no two access points have the same smallest angle. Block 42 relates to at least initially selecting the access point having a smallest magnitude to the wireless device 12 as the target access point if two or more access points have the same smallest angle to the wireless device 12. The smallest magnitude may be determined by assessing a distance of the access points to the wireless device 12, which may be based upon the wireless signaling range of the access point, the signaling strength of the two access points and/or a physical distance of the two access points.

Block 44 relates to assessing whether the selected access point is sufficient to facilitate desired signaling with the wireless device 12. This assessing may be particularly useful in identifying whether a hole exists between them wireless device 12 and the target access point in order to prevent disrupting communications with the wireless device. The hole analysis may be based on the wireless signaling range of the currently connected to access point and the target access point to determine whether the two wireless signal ranges overlap by an amount sufficient to permit continuous access to wireless services. The analysis may also include assessing whether the target access point facilitates the particular signaling or signaling protocols required to facilitate desired signaling dependent services desired by the wireless device.

Block 46 is reached in the event the target access point recommended in either one of Blocks 40, 42 is unsuitable to facilitate the desired signaling. The next smallest access point, either in angle or magnitude, may be selected as the target access point and then retested in Block 44. The testing performed in Block 44 may be an optional processing and need not necessarily be performed in order to make the recommendation to the wireless device 12. The wireless device 12 may be configured to process the recommendation on its own in order to decide whether connection to the target access point would be sufficient. In the event the connection would be insufficient, the wireless device may be configured to request the controller 26 for another target access point recommendation.

Block 48 is reached in the event the target access point recommended in either one of Blocks 40, 42 is suitable to facilitate desired signaling. A target access point recommendation message may be transmitted to the wireless device 12 in order to appraise the wireless device 12 of the target access point. The target access point recommendation message may include details regarding parameters associated with or otherwise necessary for the wireless device 12 to process in order to properly connect with the target access point, which may optionally include credentials, encryption keys or other information necessary to facilitate communicating with the target access point (such additional information may be particularly beneficial in the event the wireless device 12 is roaming to another service provider).

As noted above, one non-limiting aspect of the present invention contemplates an algorithm for formulating a target access point recommendation for use by a roaming WiFi client when performing a basic service set (BSS) transition. The process of BSS transition may include client roaming algorithms designed to facilitate fast BSS transitions as opposed to clinging to a currently associated BSS until the connection at the physical layer fails completely, i.e., identifying a target access point prior to physical layer failure in order to facilitate switching to that target access point prior to the failure. In a large scale Wi-Fi deployment, for example a metro area Wi-Fi network, users may want their device to maintain connectivity to the network as they move about the service area. The client algorithms contemplated by the present invention may be capable of performing BSS transitions in a timely manner that maintains upper layer connectivity.

One non-limiting aspect of the present invention contemplates the relying 802.11v and/or 802.11-2012, the disclosures of which are hereby incorporated by reference in their entirety, or associated Wi-Fi network controllers and/or access points to send a recommendation to the client regarding which access point it should associate to next during or approaching a BSS transition. The goal of the added information elements used to communicate this information is to enable the client to skip the majority of the access point discovery and selection process. The present invention contemplates the use of a Wireless Network Management to enable clients to minimize the time used to discover and select the next BSS to associate with. The present invention proposes specifics of how the recommendation is formed, which may optionally be independent of network load as the criteria to be used when selecting an AP.

One non-limiting aspect of the invention proposes a method to use motion and/or position of a client to formulate a BSS recommendation, including proposing the access point or network controller periodically recording the geospatial location of the client. Using this information over some finite period of time, the access point or network controller can create a vector that represents the direction and speed of travel for the client. The access point or the network controller can choose to improve the confidence level of the estimate by including multiple vectors recorded over a longer period of time. The access point or network controller then finds the difference between the calculated client vector to a set of vectors representing the direction and distance to the candidate access points neighboring the serving access point to which the client is currently associated. The access point or network controller can then rank differences by the absolute value of the angle difference from lowest to highest. The access point or network controller can then sub-rank these by magnitude from lowest to highest. The neighbor access point that has the smallest angle difference and the lowest positive magnitude can be selected for recommendation to the client as the next target access point when the client decides to do a BSS transition. To avoid causing the client to Ping-Pong between access points in some situations due to the locations of the candidate APs, before recommending the next target access point, a hysteresis operation, potentially adaptive, can be performed by the access point (AP) or network controller.

One non-limiting aspect of the present invention contemplates an algorithm for formulating a BSS recommendation to a client to allow it to transfer BSSs more efficiently and to a BSS that is in the direction of client's travel. This method may be used to improve efficiency by minimizing the number to transitions a mobile client makes because the network has better visibility into the network and the movement of the client. The present invention may be useful in improving the client roaming process for any vendor that produces an access point or network controller for use in a large area Wi-Fi deployment including but not limited to campus Wi-Fi, metro area Wi-Fi, municipal Wi-Fi, etc. The present invention may utilize client specific information based on client behavior to facilitate the target access point recommendation. This method may be beneficial in limiting transitions/handovers and thus provide a better user experience. In addition this method may reduce the network load by cutting down on short term connections made by clients that chose "the wrong" access point during a mobile BSS transition.

One non-limiting aspect of the present invention contemplates an algorithm for a serving cellular access point, such as by not been necessarily limited to eNB utilized in long-term evolution (LTE), to formulate a target eNB for use when performing a handover procedure, using location information. An eNB may be a base station in cellular networks that handles the radio communications with multiple devices (aka, UE) and carries out radio resource management and handover decisions. One non-limiting aspect of the present invention, at least in the cellular environment, contemplates performing handover processes from one eNB to another using UE-assisted and network-controlled operations. In a nutshell, as long as a UE (e.g., cell phone, portable hotspot, tablet) is switched on, it continuously measures RSRP (reference signal received power), RSRQ (received quality), etc of its own cell, as well as that of the neighboring cells, at a fixed time interval. Once an event is triggered, such as a particular neighbor cell's RSRP is higher than serving cell's RSRP plus a threshold, the UE sends a measurement report, which includes the event and the neighbor cell ID (either implicit or explicit) that triggered the report, to the current serving eNB signaling the start of the handover process. The serving eNB then commands the UE to handover to the target eNB. The list of events is specified by the eNB.

One non-limiting aspect of the present invention contemplates another method for facilitating such handover processes. This additional method may address the problem where A UE is in the process of moving away from a potential target eNB (C) and towards another potential target eNB (B), but is assigned by the serving eNB to handover to target C, due to RSRP measurements. This extra handover increases energy consumption on the UE due to signaling, un-necessary signaling traffic on the RAN (radio access network), and can potentially cause service interruptions. One of the alternative methods contemplated by the present invention proposes to use the motion and/or position of a client/UE to allow the serving eNB to formulate a target eNB in the handover process.

This may include the eNB periodically recording the geospatial location of the UE. Using this information over some finite period of time, the serving eNB can create a vector that represents the direction and speed of travel for the UE. The serving eNB can choose to improve the confidence level of the estimate by including multiple vectors recorded over a longer period of time. The serving eNB can then find the difference between the calculated UE vector to a set of vectors representing the direction and distance to the candidate cells neighboring the serving eNB to which the UE is currently associated. The serving eNB can then rank differences by the absolute value of the angle difference from lowest to highest. The serving eNB can then sub-rank s these by magnitude from lowest to highest. The neighboring cell that has the smallest angle difference and the lowest positive magnitude can be selected as the next target eNB when the handover process is triggered. Additional consideration for link quality, using the target selection criteria, can be included in the decision process to ensure session continuity. For example, if they optimal eNB directionally would result in the dropping of an active call due to poor link quality, the next eNB in the ranked list can be used.

One non-limiting aspect of the present invention contemplates an algorithm for selecting a target eNB for UE to handover to that is in the direction of client's travel. This method may be beneficial in maximizing efficiency by minimizing the number to transitions a UE makes because the network has better visibility into the network and the movement of the UE. This method could improve the UE cell roaming process for any vendor that produces an eNB or UE for cellular networks.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A non-transitory computer-readable medium having a plurality of non-transitory instructions sufficient for recommending a target access point to a wireless device, the target access point being one of a plurality of access points sufficient to facilitate wireless signaling with the wireless device, the non-transitory instructions being sufficient to:
   determine geolocation information for the device;
   determine a travel direction and a speed for the device from the geolocation information; and
   determine a vicinity according to the speed of the device determined from the geolocation information; and
   determine a size of the vicinity to cover a first area relative to the device at a first point in time and to cover a second area relative to the device at a second point in time, the second area expanding the first area when the device is moving faster at the second point in time than at the first point in time and the second area narrowing the first area when the device is moving slower at the second point in time than at the first point in time; and
   recommend the access point within the vicinity having a smallest angle to the device in the travel direction as the target access point.

2. The non-transitory computer-readable medium of claim 1 further comprising non-transitory instructions sufficient to:
   identify when the access point having the smallest angle is beyond a wireless signaling range of an access point currently facilitating wireless signaling with the device; and
   thereafter recommend the access point within the wireless signaling range having a next smallest angle to the device in the travel direction as the target access point.

3. The non-transitory computer-readable medium of claim 1 further comprising non-transitory instructions sufficient to determine the access points within the vicinity without relying on the device to provide signal strength information used to measure wireless signal strength between the device and nearby access points.

4. The non-transitory computer-readable medium of claim 1 further comprising non-transitory instructions sufficient to:
   determine the geolocation information from one or more geolocation messages transmitted from the device, the device transmitting the geolocation messages through a Wi-Fi circuit when desiring the target access point to facilitate Wi-Fi signaling and transmitting the geolocation messages through a cellular circuit when desiring the target access point to facilitate cellular signaling; and
   transmit a target access point recommendation message to the device sufficient for identifying the target access point, including transmitting the target access point recommendation message to the Wi-Fi circuit when Wi-Fi signaling is desired and transmitting the target access point recommendation message to the cellular circuit when cellular signaling is desired.

5. The non-transitory computer-readable medium of claim 1 further comprising non-transitory instructions sufficient to:
   determine whether each access point in the vicinity supports at least one of Wi-Fi signaling and cellular signaling; and
   determine whether the device requires at least one of Wi-Fi and cellular signaling; and
   determine the target access point to be one of the access points within the vicinity supporting Wi-Fi signaling if the device requires Wi-Fi signaling and to be one of the access points within the vicinity supporting cellular signaling if the device requires cellular signaling.

6. The non-transitory computer-readable medium of claim 1 further comprising non-transitory instructions sufficient to:
   determine a probability of the device to continue in the travel direction;
   recommend the access point having the smallest angle as the target access point when the probability is greater than a threshold; and
   recommend another access point within the vicinity not having the smallest angle to the device as the target access point when the probability is less than the threshold.

7. The non-transitory computer-readable medium of claim 1 further comprising non-transitory instructions sufficient to:
   determine a velocity vector from the geolocation information, the velocity vector indicating the travel direction and a speed of the device;
   determine a Euclidean vector for each of the access points within the vicinity relative to the device; and
   determine the smallest angle based on angular difference between the velocity vector and each of the Euclidean vectors.

8. A wireless communication system comprising:
   a plurality of wireless access points geographically spaced and configured to facilitate wireless signaling with a wireless device;
   an access point controller configured to recommend a target access point to the wireless device, the target access point being one of the plurality of wireless access points for the wireless device to connect with next; and
   wherein the access point controller is configured to:
   i) determine a speed and a direction of movement for the wireless device;
   ii) determine each of the plurality of wireless access points within a vicinity of the device as a function of the speed;
   iv) determine the vicinity to cover a first area at a first point in time and to cover a second area at a second point in time, the second area expanding the first area when the wireless device is moving faster at the second point in time than at the first point in time and the second area narrowing the first area when the wireless device is moving slower at the second point in time than at the first point in time; and
   v) recommend the access point within the vicinity having a smallest angular difference to the direction of movement as the target access point.

9. The system of claim 8 wherein:
   the wireless device includes:
   i) a global positioning system (GPS) circuit operable to generate geolocation information;
   ii) a Wi-Fi circuit operable to facilitate Wi-Fi based wireless signaling; and
   iii) a cellular circuit operable to facilitate cellular based wireless signaling; and
   the access point controller:
   i) determines the speed and the direction of movement from the geolocation information;
   ii) determines wireless capabilities of the wireless access points in the vicinity to be associated with supporting at least one of Wi-Fi based wireless signaling and cellular based wireless signaling;
   iii) recommends the target access point having the smallest angle and capabilities to support Wi-Fi based signaling when the wireless device desires Wi-Fi based signaling; and
   iv) recommends the target access point having the smallest angle and capabilities to support cellular based signaling when the wireless device desires cellular based signaling.

10. The system of claim 9 wherein the access point controller recommends the access point without relying on a cellular circuit or a Wi-Fi circuit included on the device to measure or detect wireless signaling strength between the device and the access points within the vicinity.

11. The system of claim 10 wherein the access point controller wirelessly transmits a target access point recommendation message to the device through at least one of the cellular circuit and the Wi-Fi circuit, the target access point recommendation message identifying the target access point to the wireless device.

12. The system of claim 8 wherein the access point controller is included on the wireless device.

13. A non-transitory computer-readable medium having a plurality of non-transitory instructions sufficient for recommending a target access point to a wireless device, the target access point being one of a plurality of wireless access points available to the wireless device to facilitate wireless signaling after the wireless disconnects from a current wireless access point, the non-transitory instructions being sufficient for:
   determining a first travel direction and a first speed for the wireless device at a first instance in time, the first instance corresponding with the wireless device being connected to the current wireless access point;
   determining a first plurality of the plurality of wireless access points within a first vicinity of the wireless device as a function of the first travel direction and the first speed;
   determining a first size of a first vicinity as a function of the first speed;
   identifying the target access point to the wireless device at the first instance as one of the first plurality of the wireless access points having a smallest angle to the first travel direction; and
   determining a second travel direction and a second speed for the wireless device at a second instance in time, the second instance occurring before the wireless device disconnects from the current wireless access point following the first instance;
   determining a second plurality of the plurality of wireless access points within a second vicinity of the wireless device as a function of the second travel direction and the second speed;
   determining a second size of a second vicinity as a function of the second speed, including determining the second size to be narrower than the first size in the event the second speed is less than the first speed and determining the second size to be wider than the first size in the event the second speed is greater than the first speed;
   identifying the target access point to the wireless device at the second instance as one of the second plurality of the wireless access points having a smallest angle to the second travel direction.

14. The non-transitory computer-readable medium of claim 13 further comprising non-transitory instruction sufficient for determining a shape of the first size and the second size to be the same.

15. The non-transitory computer-readable medium of claim 13 further comprising non-transitory instructions sufficient for identifying a trigger event, the triggering event identifying when the wireless device is to disconnect from the current wireless access point and connect with the target wireless access point.

* * * * *